(12) United States Patent
Isgar

(10) Patent No.: US 11,246,007 B2
(45) Date of Patent: Feb. 8, 2022

(54) LOCATION-BASED INTERACTION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 17/102,750

(22) Filed: Nov. 24, 2020

(65) Prior Publication Data

US 2021/0084442 A1    Mar. 18, 2021

Related U.S. Application Data

(63) Continuation-in-part of application No. 16/985,026, filed on Aug. 4, 2020.

(60) Provisional application No. 62/882,691, filed on Aug. 5, 2019.

(51) Int. Cl.
| | | |
|---|---|---|
| *H04W 4/02* | (2018.01) | |
| *H04W 4/21* | (2018.01) | |
| *H04W 4/12* | (2009.01) | |

(52) U.S. Cl.
CPC ............ *H04W 4/023* (2013.01); *H04W 4/12* (2013.01); *H04W 4/21* (2018.02)

(58) Field of Classification Search
CPC ..... H04W 4/023; H04W 4/029; H04W 4/021; H04W 4/06

USPC ...................................................... 455/456.3
See application file for complete search history.

(56) References Cited

U.S. PATENT DOCUMENTS

| | | | |
|---|---|---|---|
| 2011/0225069 A1* | 9/2011 | Cramer ................. | G06Q 30/06 705/27.1 |
| 2014/0108530 A1 | 4/2014 | Papakipos et al. | |
| 2015/0189026 A1 | 7/2015 | Cohen et al. | |
| 2017/0156026 A1* | 6/2017 | Reudink ................. | H04W 4/02 |

* cited by examiner

*Primary Examiner* — Ted M Wang
(74) *Attorney, Agent, or Firm* — Schmeiser, Olsen & Watts LLP

(57) ABSTRACT

Described is a location-based interaction system. The system includes a server having a memory storing user data and a user computing device coupled to the server. The server may be programmed to receive and process a signal that user computing devices coupled to external devices have accessed the system and are within a predetermined proximity of each other. The system operates to send alert signals to the external devices, wherein the alert signals may be visual, audio or haptic. The system allows users to communicate through the use of external devices and/or through a communication interface.

12 Claims, 18 Drawing Sheets

LOCATION-BASED INTERACTION SYSTEM

CROSS REFERENCE TO RELATED APPLICATION

This application is a continuation-in-part of U.S. patent application Ser. No. 16/985,026, which claims priority to U.S. Provisional Patent Application Ser. No. 62/882,691, the disclosures of which are hereby incorporated entirely herein by reference.

BACKGROUND OF THE INVENTION

Technical Field

This invention generally relates to a system for interacting with others, and more specifically to a system for location-based interaction system for communicating with others based on locations of users of the system.

State of the Art

There are several instances where an individual may have a desire to communicate with another individual that is within a certain proximity to the individual. For example, such instances may include while in transit, in a line or in other circumstances when people like to communicate. Further, many people enjoy getting to know new people but lack the confidence to get to know someone when they have to interact face-to-face or in other similar circumstances. Additionally, people lack confidence when they do not know of any similarity that they have with those around them. There lacks a system that allows users to communicate with each other and to do so with individuals that have a common tie or commonality.

Accordingly, what is needed is a system for social interaction between users within proximity to each other.

SUMMARY OF THE INVENTION

An embodiment includes a location-based interaction system comprising: a server having a memory storing user data and user preferences for a plurality of users; a first user computing device coupled to the server; and a first external device coupled to the user computing device, wherein: the server is programmed to: receive an access signal from the first user computing device that has accessed the system, wherein the access signal includes first user data having first location information of the first user computing device; in response to receiving the access signal from the first user computing device, process the first user data and locate user preferences associated with the first user data and determine at least a second user computing device that has accessed the system and is within a predetermined proximity to the first user computing device and is associated with second user data that meets the user preferences associated with the first user data; and create and send for execution on the first user computing device instruction to send a first alert signal to the first external device; and the first user computing device is programmed to: automatically execute the instruction from the server to send the first alert signal to the first external device and send the first alert signal to the first external device for automatic execution, wherein the first external device broadcasts a first alert in response to receiving and processing the first alert signal.

An embodiment includes a location-based interaction system comprising: a server having a memory storing user data and user preferences; and a user computing device coupled to the server, wherein the server is programmed to: receive an access signal from the user computing device that has accessed the system, wherein the access signal includes user data having location information of the user computing device; in response to receiving the access signal from the user computing device, process the user data and locate user preferences associated with the user data and determine various users that have accessed the system and are within a predetermined proximity to the user computing device that meet the user preferences; create and send for display on the user computing device a selectable element on the user interface for each of the various users; receive a communication signal from the user computing device, the communication signal having communication data in response to selecting at least one selectable element from the various selectable elements displayed on the user interface on the user computing device; process the selection and send for display on the user computing device, a communication interface for communicating between the user computing device and a user corresponding to the selected selectable element.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a system for social interaction between users within proximity to each other. The system may include the use of a mobile application operating on a user computing device that may be a mobile computing device like a smartphone, a tablet, a wearable, and the like; and/or the system may operate on any type of computing device as a downloadable application or even as a web application.

Figure 1A:
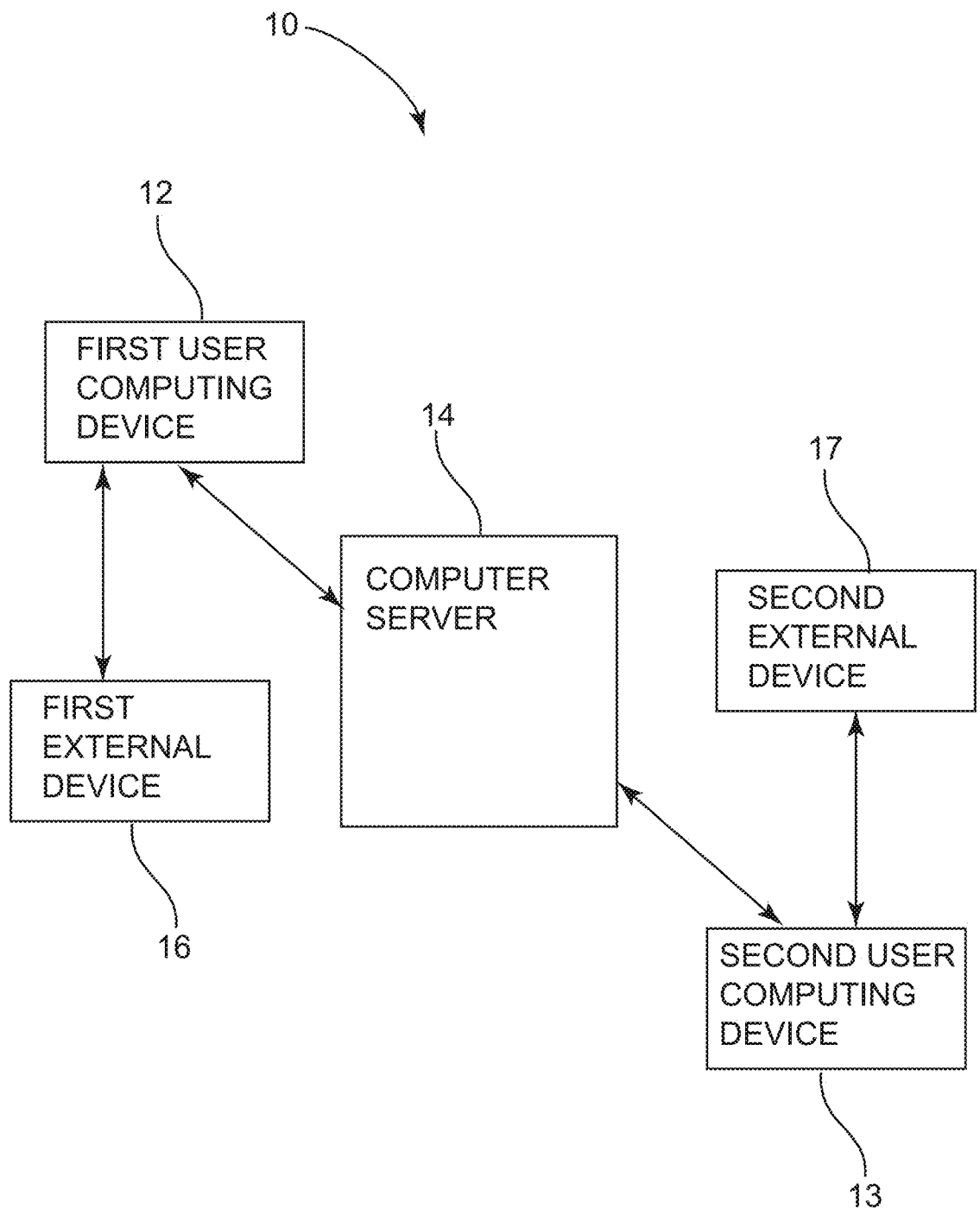
FIG. 1A is a diagrammatic view of a location-based interaction system according to an embodiment.

FIG. 1A depicts an embodiment of a location-based interaction system 10. The system 10 may include at least a first user computing device 12, a second user computing device 13 and a server 14, wherein each first user computing device 12 and the second user computing device 13 are coupled to the computer server 14. The coupling between the user computing device 12 and the server 14 and the second user computing device 13 and the server 14 may be network connections, such as wireless connections through independent Internet connections, independent Wi-Fi connections, independent Bluetooth connections or the like, wherein the user computing device 12 and the second user computing device 13 may each independently communicate with and receive communication from the server 14. The system 10 may also include first external device 16 and second external device 17, wherein the external device 16 is coupled to the first user computing device 12 and the second external device 17 is coupled to the second user computing device 13. The coupling between the first user computing device 12 and the first external device 16 and the coupling between the second user computing device 13 and the second external device 17 may each be a wireless connection such as, but not limited to, a Wi-Fi connection, a Bluetooth connection or the like, wherein the first user computing device 12 and the second user computing device 13 may communicate with and receive communication from the first external device 16 and the second external device 17 respectively. The first user computing device 12 and the second user computing device 13 may each be a desktop computer, a laptop, a tablet, a smartphone, a wearable device, and the like. The server 14, in some embodiments, may be a computer server or a cloud-based infrastructure architecture. The first external device 16 and the second external device 17 may each be a name tag, a lanyard, a vehicle computing system, smart jewelry, smart devices coupled to other items, and so forth.

The server 14 may include a memory storing user data. The memory of the server 14 may store user data, such as a username, a password, and profile information. The user data may also include other identifying information of the user, such as employer, profession, college attending or graduated from, hobbies, likes, interests and the like. The server 14 may also include user preferences stored in the server, wherein the user preferences are associated with the user data. The user preferences may include a selection of one or more of the user data, such as selection of one or more of the other identifying information of the user, such as employer, profession, college attending or graduated from, hobbies, likes, interests and the like. The user preferences may be utilized as criteria to find other users that have related or the same identifying information, such as employer, profession, college attending or graduated from, hobbies, likes, interests and the like.

Figure 15:
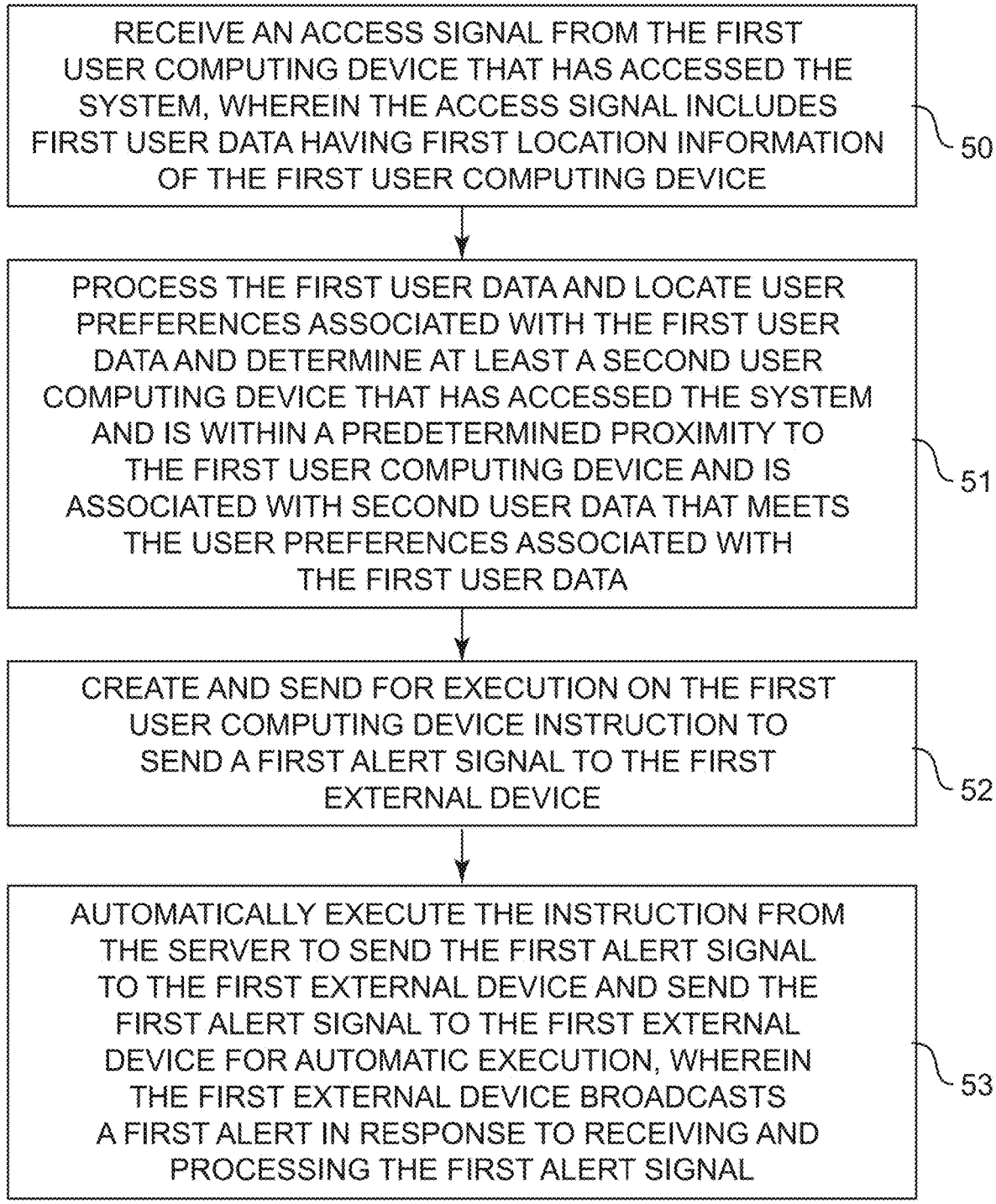
FIG. 15 is a flow chart of a first embodiment of programmed instructions for operation of a location-based interaction system according to an embodiment.

A first user computing device 12 may be coupled to the server 14 and a first external device 16 may be coupled to the first user computing device 12. Referring further to FIGS. 1A and 15, the server 14 may be programmed to receive an access signal from the first user computing device 12 that has accessed the system 10, wherein the access signal includes first user data having first location information of the first user computing device 12 (Step 50). In response to receiving the access signal from the first user computing device 12, process the first user data and locate user preferences associated with the first user data and determine at least a second user computing device 13 that has accessed the system 10 and is within a predetermined proximity to the first user computing device 12 and is associated with second user data that meets the user preferences associated with the first user data (Step 51). The server 14 may further be programmed to create and send for execution on the first user computing device 12 instruction to send a first alert signal to the first external device 16 (Step 52). The first user computing device 12 is programmed to: automatically execute the instruction from the server 14 to send the first alert signal to the first external device 16 and send the first alert signal to the first external device 16 for automatic execution, wherein the first external device 16 broadcasts a first alert in response to receiving and processing the first alert signal (Step 53).

Operation of the system 10 may further include the server 14 being programmed to create and send for execution on the second user computing device 13 instruction to send a second alert signal to a second external device 17 at substantially the same time as sending instructions to the first user computing device 12 to send the first alert signal to the first external device 16. The second user computing device 13 is programmed to automatically execute the instruction from the server 14 to send the second alert signal to the second external device 17 and send the second alert signal to the second external device 17 for automatic execution, wherein the second external device 17 broadcasts a second alert in response to receiving and processing the second alert signal.

According to embodiments, the first and second alerts may be visual alerts, audio alerts, haptic alerts or combinations thereof. The visual alerts may include lights, graphics, text or the like. The audio alert may include sounds, beeps, songs, or the like. The haptic alerts may include vibration of the external devices 16 and 17.

While it is depicted that there are first and second user computing devices 12 and 13 coupled to first and second external device 16 and 17 respectively, the system may be configured to operate with multiple user computing devices and external devices. Examples of operation of the system 10 from FIGS. 1A and 15 are shown in FIGS. 2-10 and 12-14.

Figure 2:
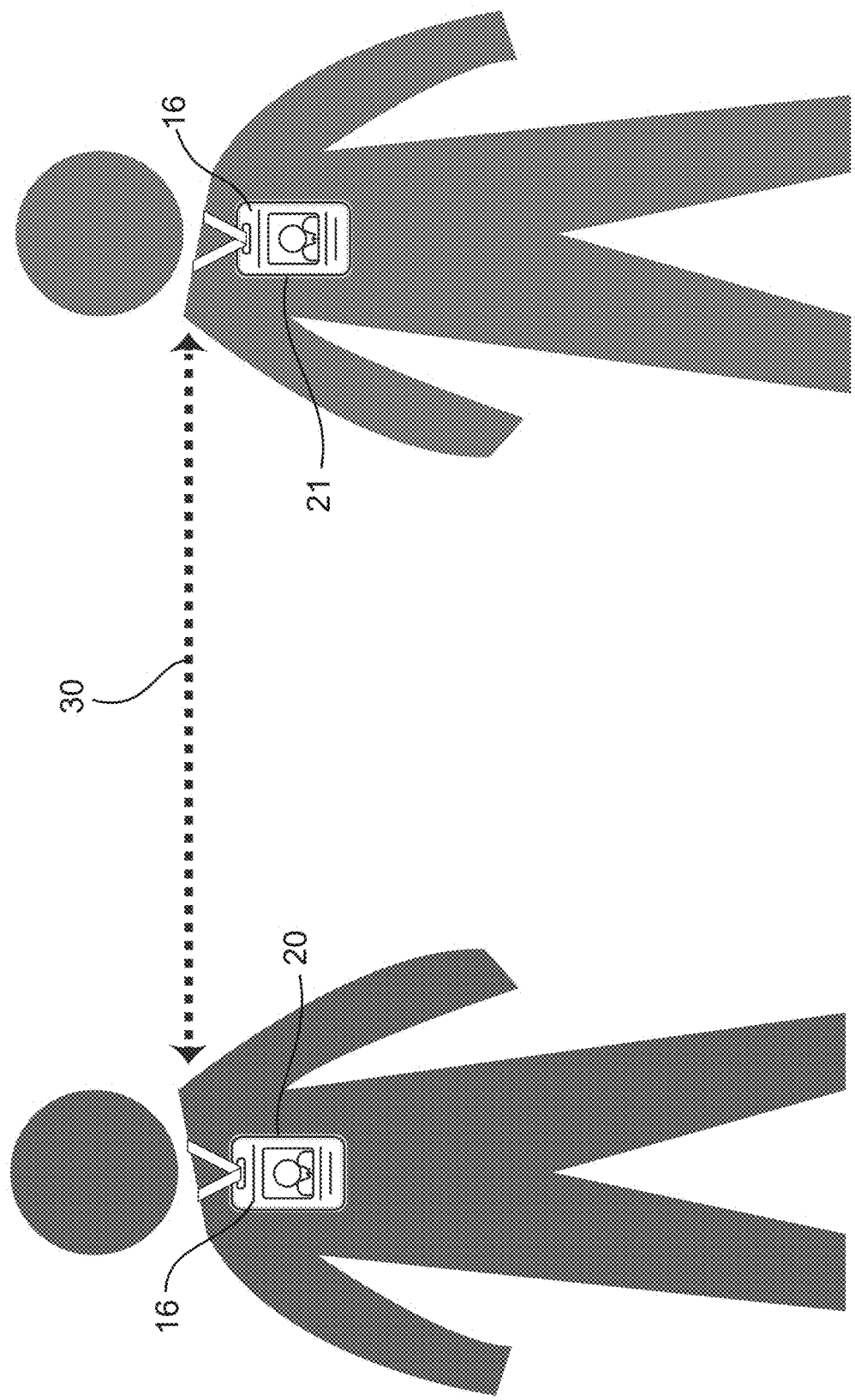
FIG. 2 is a front view of users with name tags operating as part of a location-based interaction system according to an embodiment.
Figure 3:
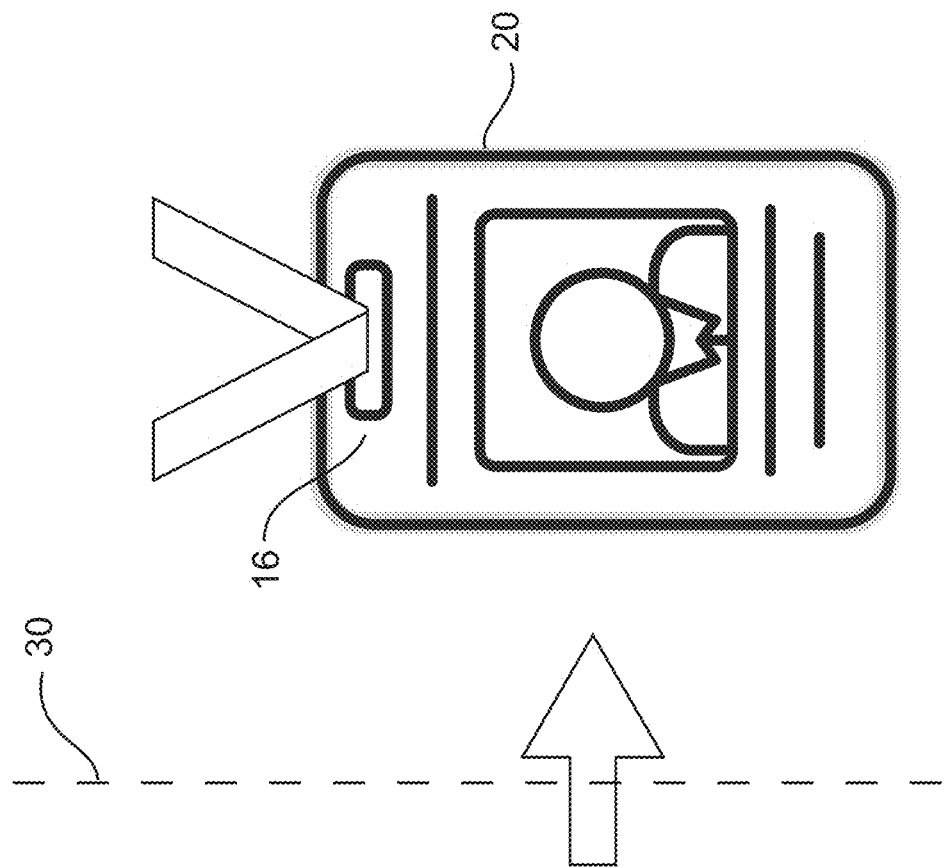
FIG. 3 is a front view of name tags operating as part of a location-based interaction system according to an embodiment.

FIGS. 2 and 3 depict a first external device 16 that is a name tag and a second external device 17 that is a name tag. When the first user computing device 12 and the second user computing device 13 (not shown) are within a predetermined proximity 30 of each other, the first external device 16 broadcasts an alert 20, such as a visual light alert as depicted. Additionally, the second external device 17 broadcasts an alert 21, such as a visual light alert as depicted. A close-up view of the first external device 16 depicted in FIG. 3 shows how the external device 16 moves from outside of the predetermined proximity 30 to within the predetermined proximity 30 resulting in broadcasting the visual light alert 20. In operation, the system 10 may be utilized to meet with others during a convention, or the like, as shown in FIGS. 2 and 3. One of the issues in meeting others is that it is difficult to identify individuals, particularly if you have not met with that individual before. The system 10 may operate to connect people such that when each user is within the predetermined proximity, the first and second external devices 16 and 17 broadcast the same visual alert 20 and 21, such as the same color light, like yellow as depicted in FIG. 2. The system may have a plurality of color lights and the external devices may include the ability to produce various color lighting. This allows people who are intended to meet together to simply locate the individual with the same color lighted name tag, thereby reducing the difficulty in locating each other.

Figure 4:
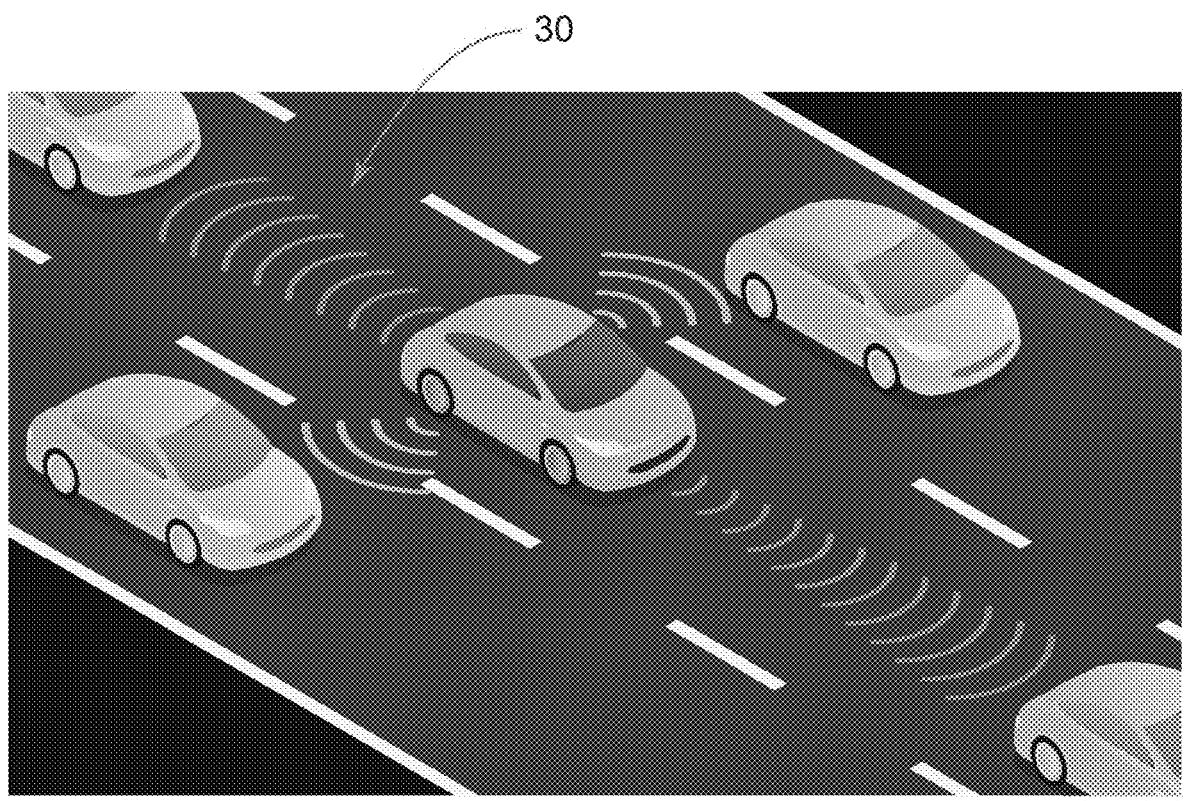
FIG. 4 is a perspective view of user computing devices within vehicles operating a location-based interaction system according to an embodiment.
Figure 5A:
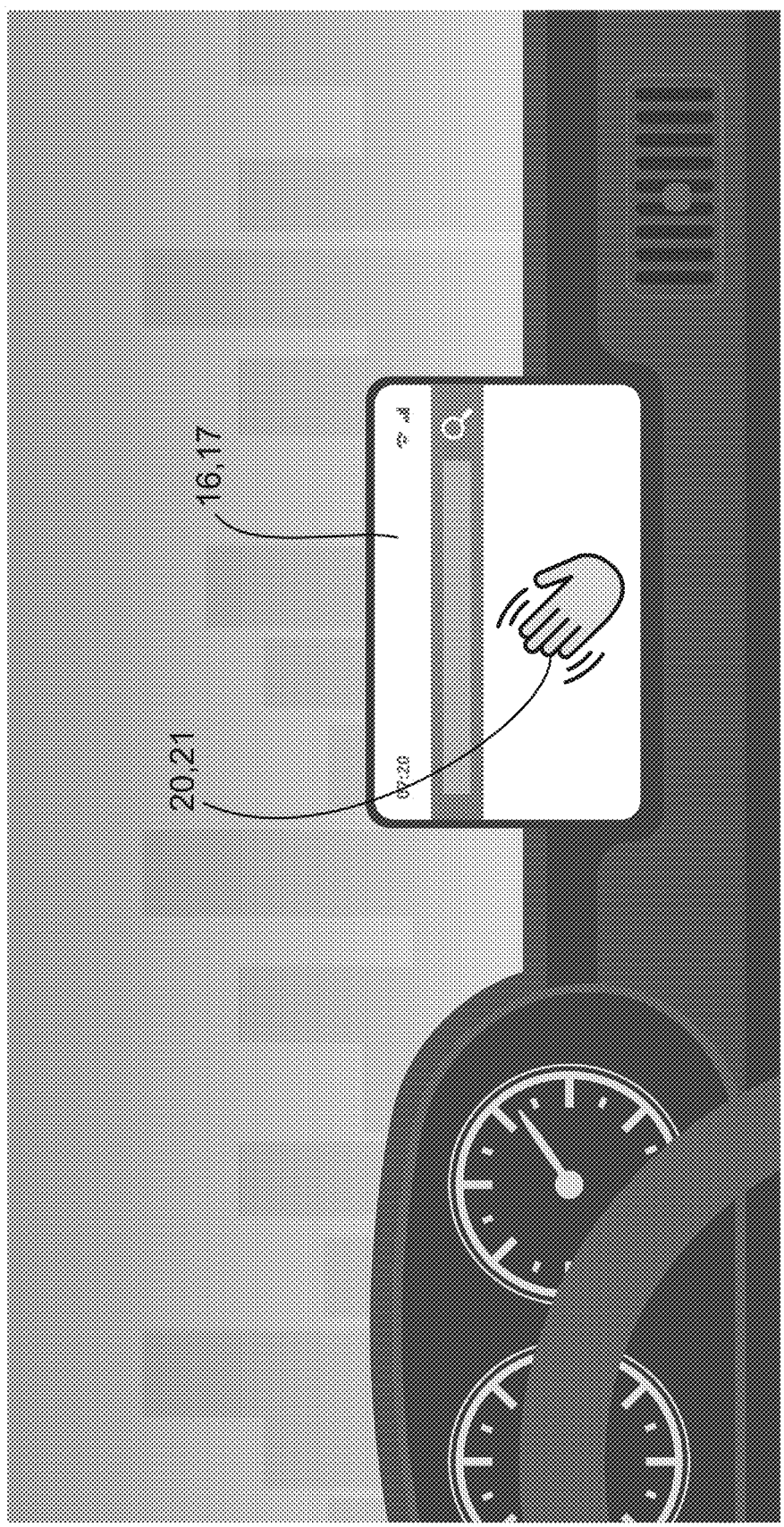
FIG. 5A is a user interface of a user computing device that is a vehicle computing device operating a location-based interaction system according to an embodiment.
Figure 5B:
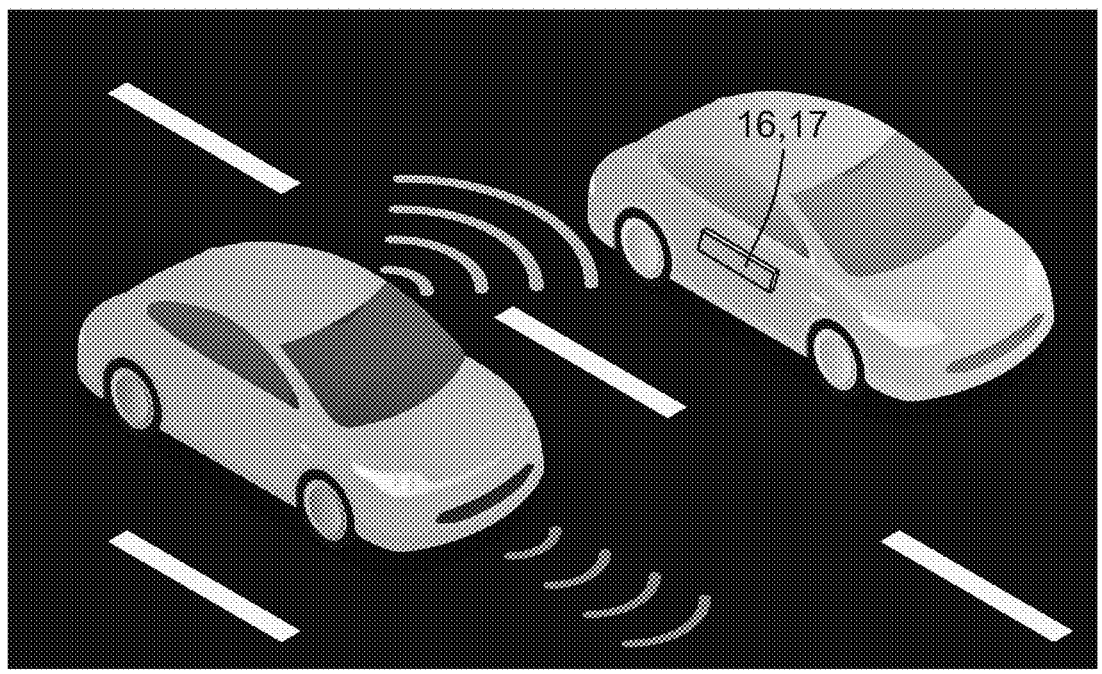
FIG. 5B is a perspective view of an external device that is coupled to a vehicle computing device operating a location-based interaction system according to an embodiment.

FIGS. 4-5B depict the system 10 being utilized in vehicles that are within a predetermined proximity 30 of each other. As shown in FIG. 5A, the external device 16, 17 may be a vehicle computer operating a touch screen. The alert 20, 21 may be a visual alert that is a graphic, like an emoji, that is displayed on the touch screen of the external device 16, 17. As shown in FIG. 5B, the external device 16, 17 may be a device coupled to an exterior of the vehicle, like a magnetic sign or the like, wherein the alert 20, 21 may be a visual alert that is a light or the like.

Figure 10:
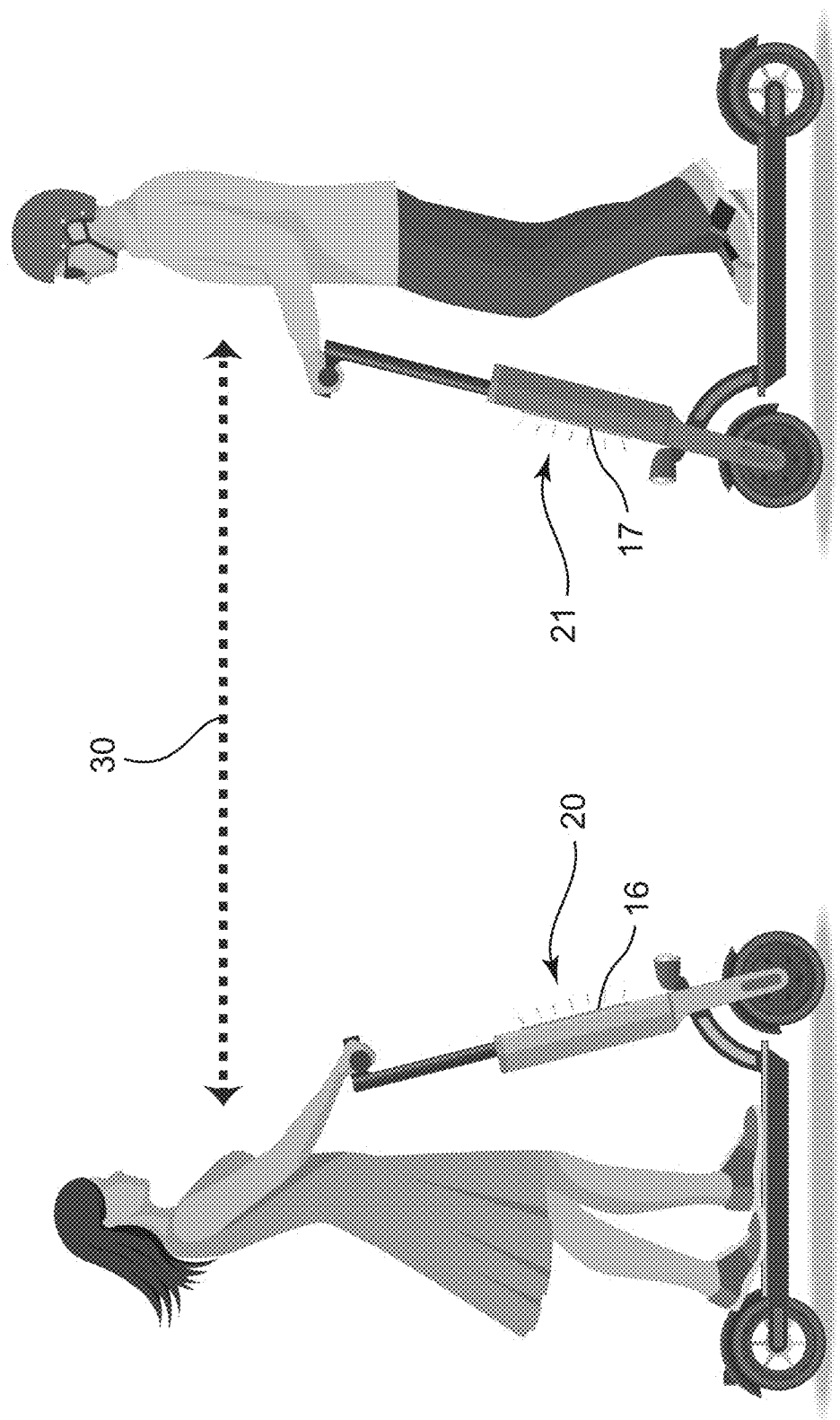
FIG. 10 is a side view of users with scooters operating as part of a location-based interaction system according to an embodiment.

FIG. 10 depicts a first external device 16 that is a smart device coupled to a scooter and a second external device 17 that is a smart device coupled to a scooter. When the first user computing device 12 and the second user computing device 13 (not shown) are within a predetermined proximity 30 of each other, the first external device 16 broadcasts an alert 20, such as a visual light alert as depicted. Additionally, the second external device 17 broadcasts and alert 21, such as a visual light alert as depicted.

Figure 6:
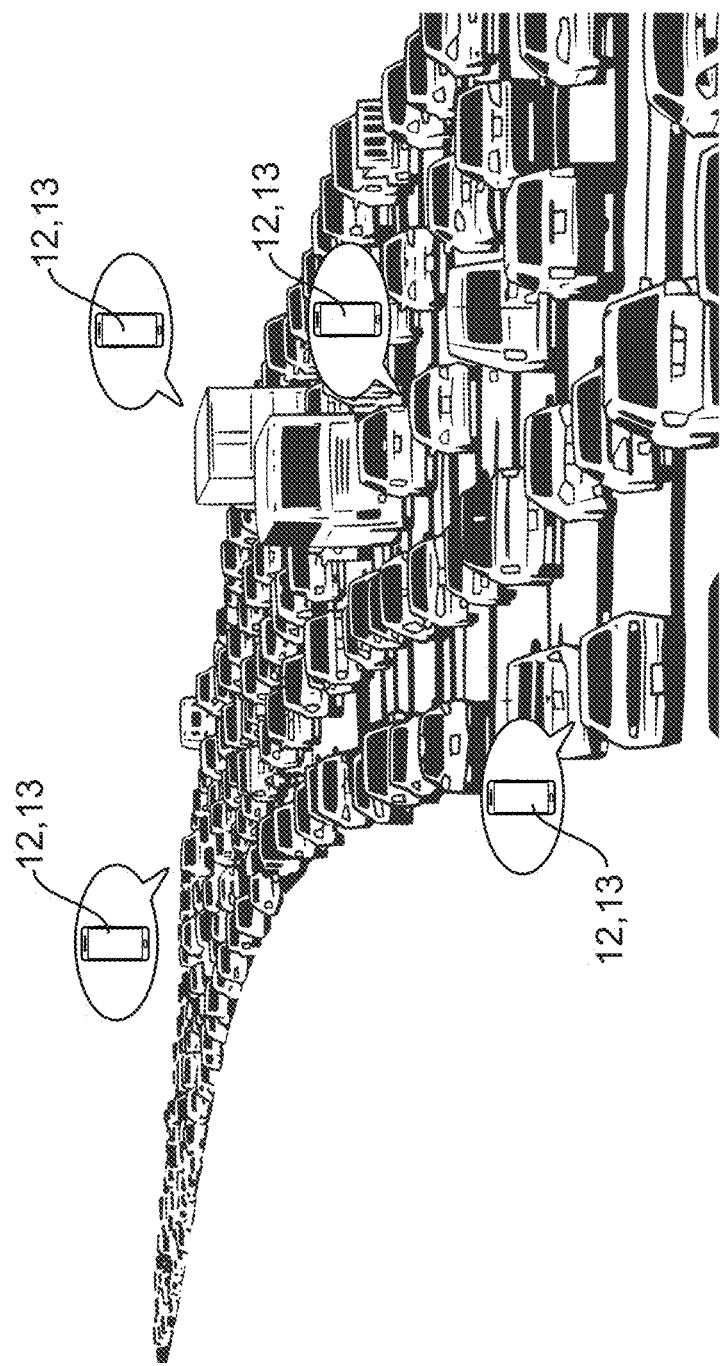
FIG. 6 is a perspective view of user computing devices within vehicles operating a location-based interaction system according to an embodiment.
Figure 7:
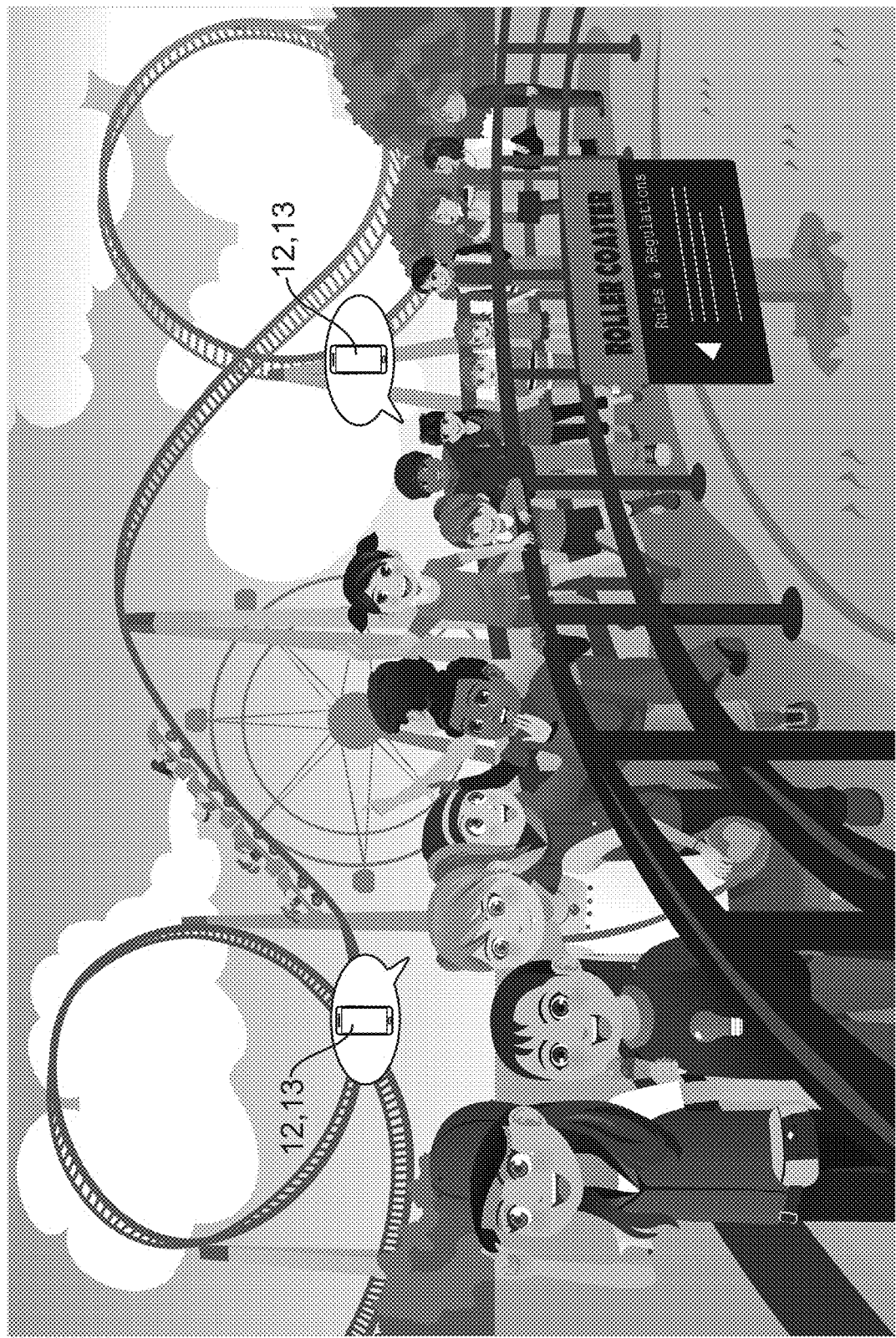
FIG. 7 is a perspective view of user computing devices used by individuals operating a location-based interaction system waiting in a line according to an embodiment.
Figure 8:
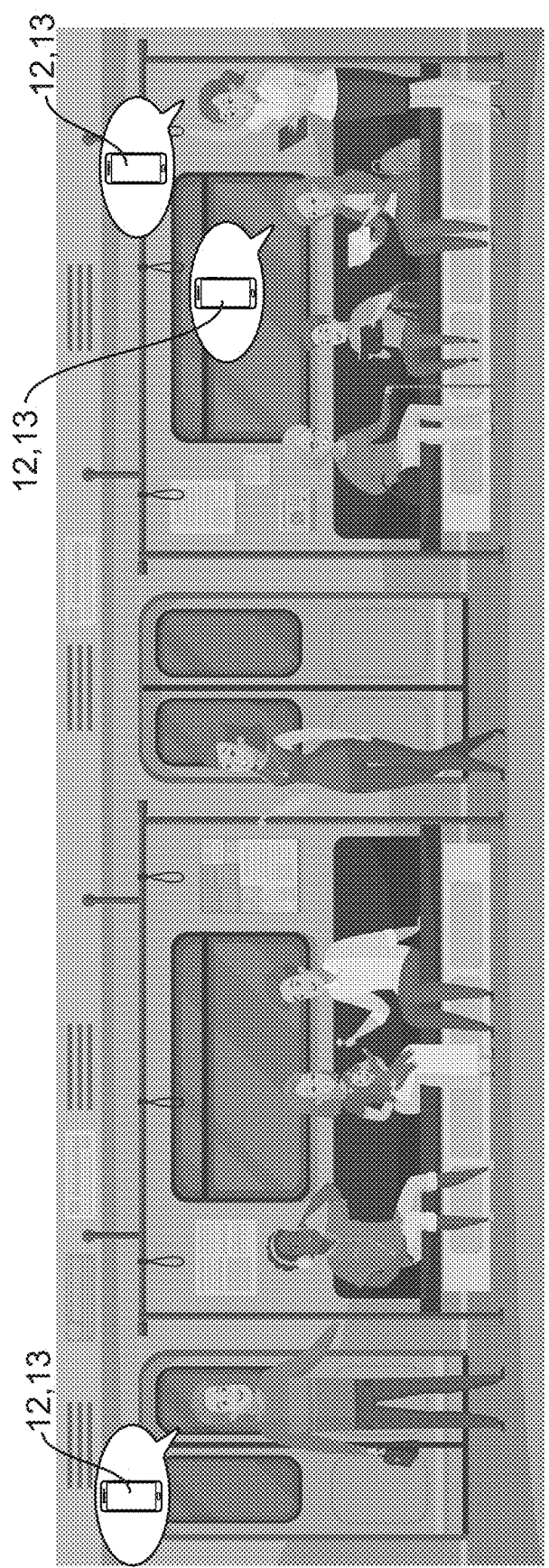
FIG. 8 is a perspective view of user computing devices used by individuals operating a location-based interaction system on a train according to an embodiment.
Figure 9:
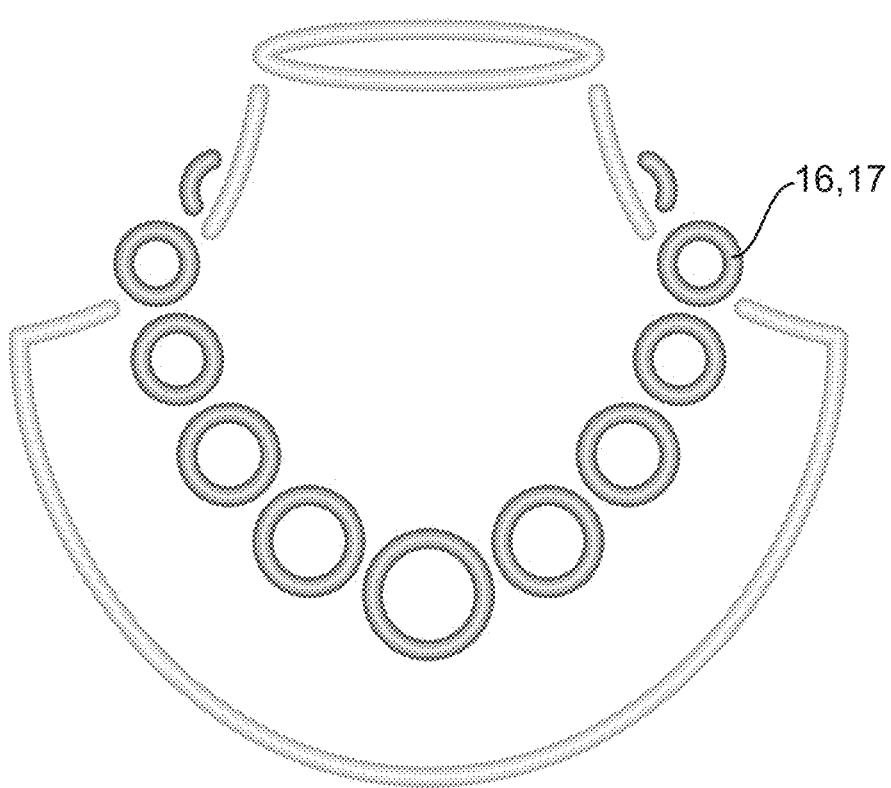
FIG. 9 is a front view of a necklace for use with a location-based interaction system according to an embodiment.

Further still, the system 10 may be utilized in many different situations, such as in traffic, as shown in FIG. 6, waiting in line, such as shown in FIG. 7, in transit on a train or bus, as depicted in FIG. 8, or the like. In each instance, the external device may be any type of device, such as a wearable or the like. One such wearable may be jewelry, depicted in FIG. 9 as a necklace that can light up. These external devices may include onboard computing and communication capabilities in order to communicate with user computing devices and to execute instruction in order to provide alerts. As described above, the system 10 may operate to assist individual in meeting up with each other, particularly in first time meetings. These first time meetings may be between two or more individuals, such as, but not limited to, meetings such as convention meetings, business meetings, service provider meetings, meeting a travel host, meeting a tutor, meeting a tour guide, meeting a date, meeting a group excursion, meeting a study group, meeting a rideshare, meeting a delivery person, and the like.

Figure 12:
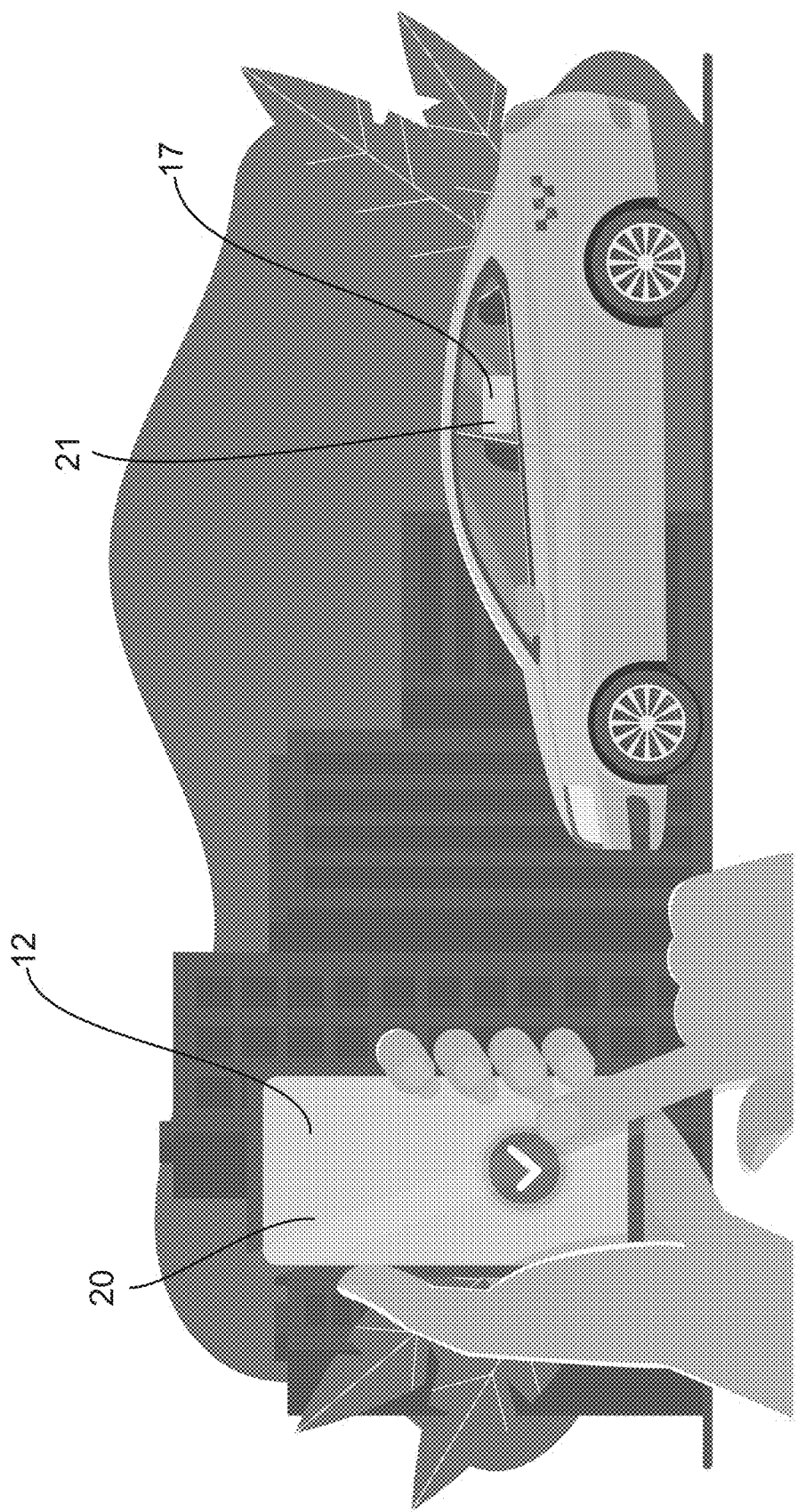
FIG. 12 is a view of a user computing device and an external device operating as part of a location-based interaction system used in a ride share system according to an embodiment.

Additionally, the system 10 may operate as part of a ride share system, as depicted in FIG. 12. For example, a first user computing device 12 may be operated by a user seeking a ride. A second user computing device 13 (not shown) may be operated by a driver within a vehicle and coupled to a second external device 17 that is coupled to the vehicle and is visible from an exterior of the vehicle. When the vehicle with the second computing device 13 is within a predetermined proximity of the first user computing device 12, the alert 21 is displayed on the second external device 17. Additionally, in this and like embodiments, an alert 20 may be displayed on the first user computing device's 12 screen. The alerts 20 and 21 may be colored lights, wherein the same colored lights indicate a match of a rider with a driver, thereby reducing confusion in areas with several requesting riders using the ride share system.

Figure 13:
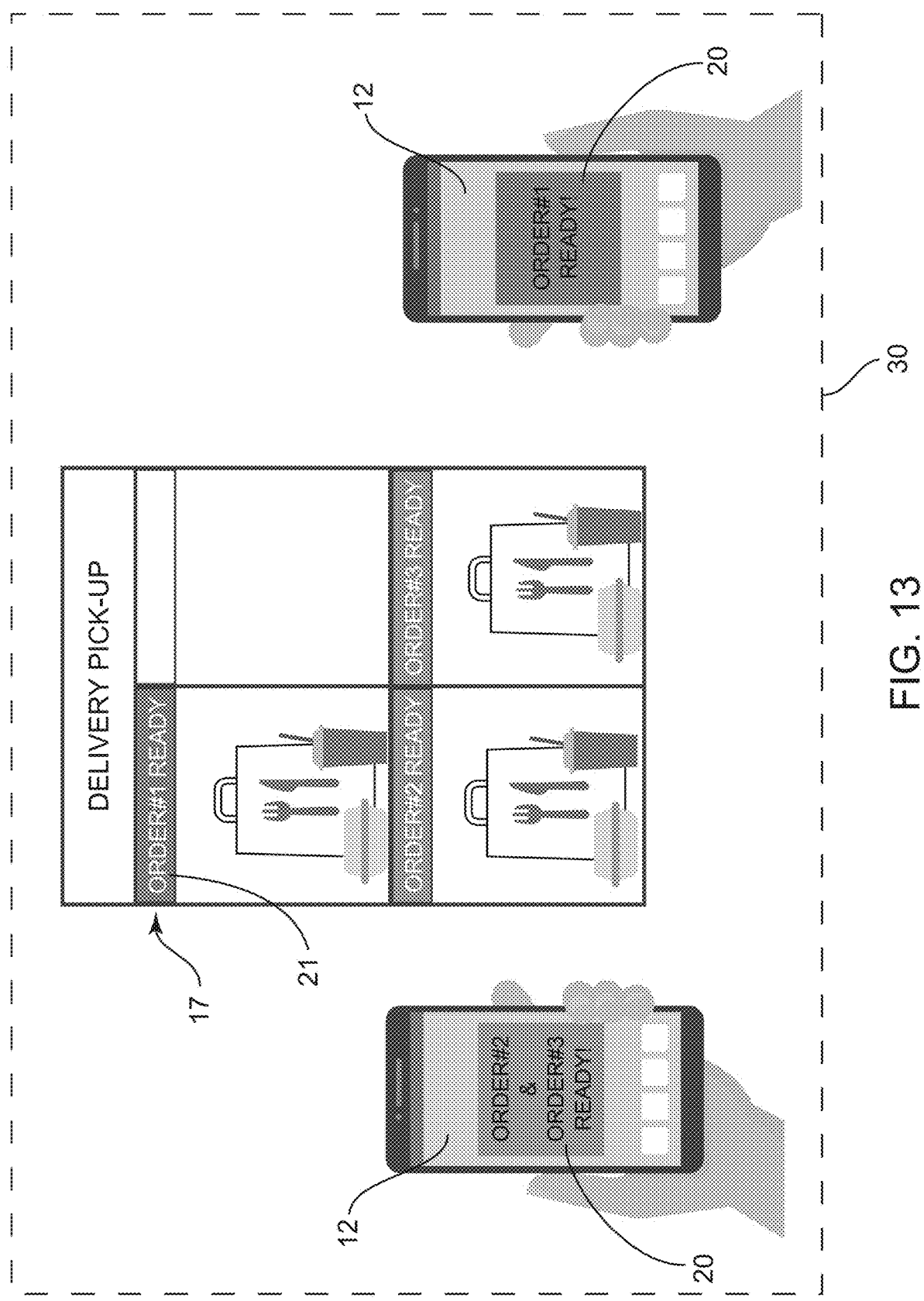
FIG. 13 is a view of a user computing device and an external device operating as part of a location-based interaction system used in a food delivery pickup system according to an embodiment.
Figure 14:
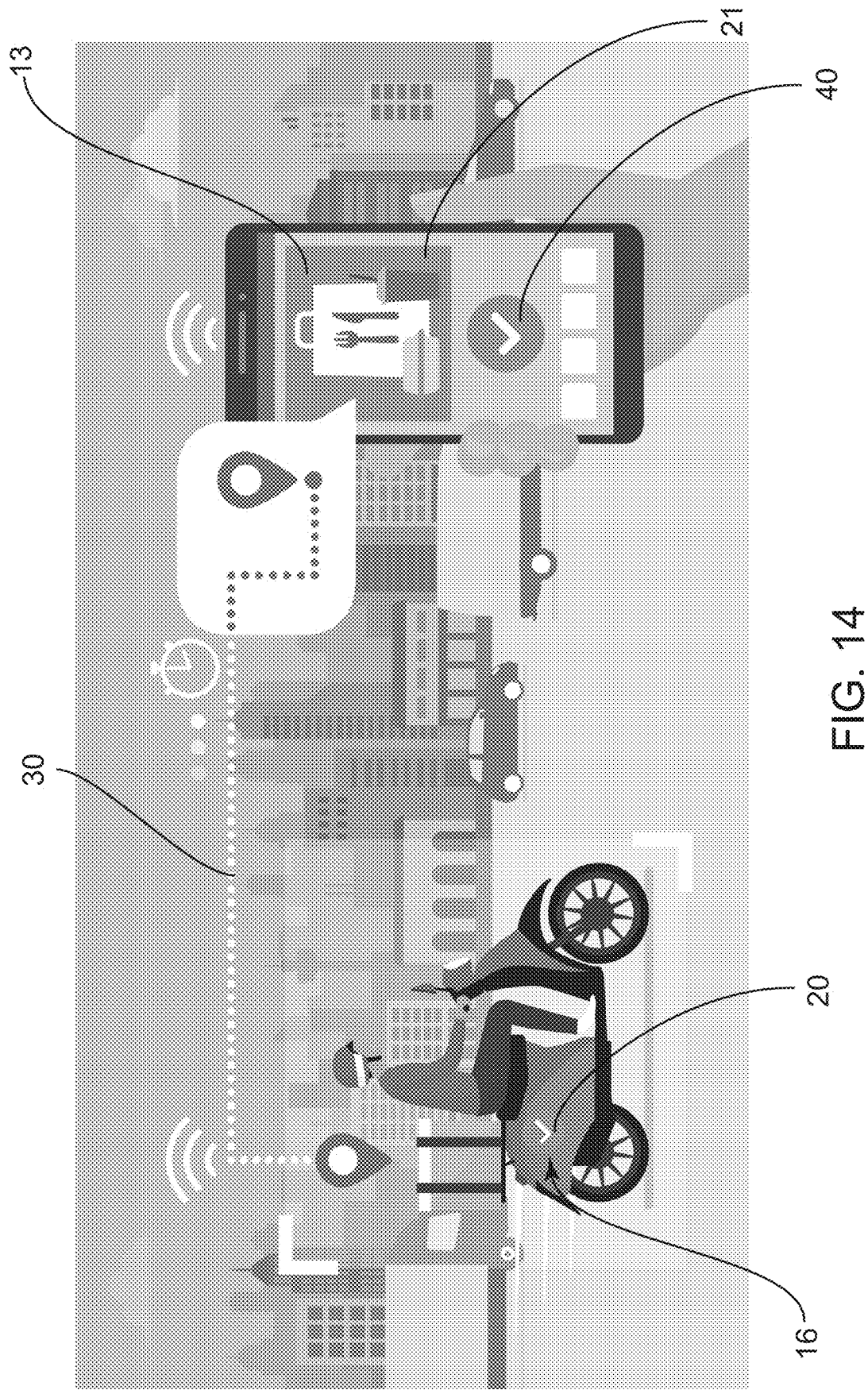
FIG. 14 is a view of a user computing device and an external device operating as part of a location-based interaction system used in a food delivery drop-off system according to an embodiment.

FIGS. 13-14 depict another embodiment for use of the system 10 operating as part of a food delivery system. FIG. 13 depicts a first user computing device 12 being operated by a user that is a delivery person. A second user computing device 13 (not shown) may be operated by a restaurant and coupled to a second external device 17 that is coupled to a pickup location, like shelving or the like as depicted in FIG. 13. When the delivery person operating the first user computing device 12 enters a restaurant to pick an order and is within a predetermined proximity 30 of the pickup location, the alert 21 is displayed on the second external device 17. Additionally, in this and like embodiments, an alert 20 may be displayed on the first user computing device's 12 screen. The alerts 20 and 21 may be colored lights, wherein the same colored lights indicate a match of a food order with a delivery person, thereby reducing confusion in areas with several orders for food made using the food delivery system. The delivery person may pick up one or more orders, and, as shown in FIG. 13 with regard to Order#1 and then Order#2 and 3, wherein the alerts 20 and 21 are the same color depicting which order is for which delivery person to increase ease of picking up orders for delivery.

Once the delivery person has the food, as shown in FIG. 14, a first user computing device 12 (not shown) may be operated by a user that is the delivery person, the first user computing device 12 being coupled to a first external device 16. A second user computing device 13 may be operated by a customer requesting the food order. When the delivery person operating the first user computing device 12 approaches a delivery location, the alert 20 is displayed on the first external device 16 coupled to the delivery vehicle in a visible location. Additionally, in this and like embodiments, an alert 21 may be displayed on the second user computing device's 13 screen. The alerts 20 and 21 may be colored lights, wherein the same colored lights indicate a match of a food order carried by a delivery person with a customer who ordered the food, thereby better connecting the delivery person with the ordering customer. Additionally, some embodiments may include a button 40 on the user computing device 12, wherein the user may press the button 40 to provide an additional alert to the delivery person that the customer was close to and ready for the order. For example, pressing button 40 may result in the second external device 17 blinking, issuing a sound or vibration in order to alert the delivery person that they were close. Further, it may provide more detailed directions to deliver the food order to the customer.

It is contemplated that the system 10 may be utilized in other various industries for various uses. For example, and without limitation, luggage systems, distribution systems, medical facilities, and the like.

Figure 1B:
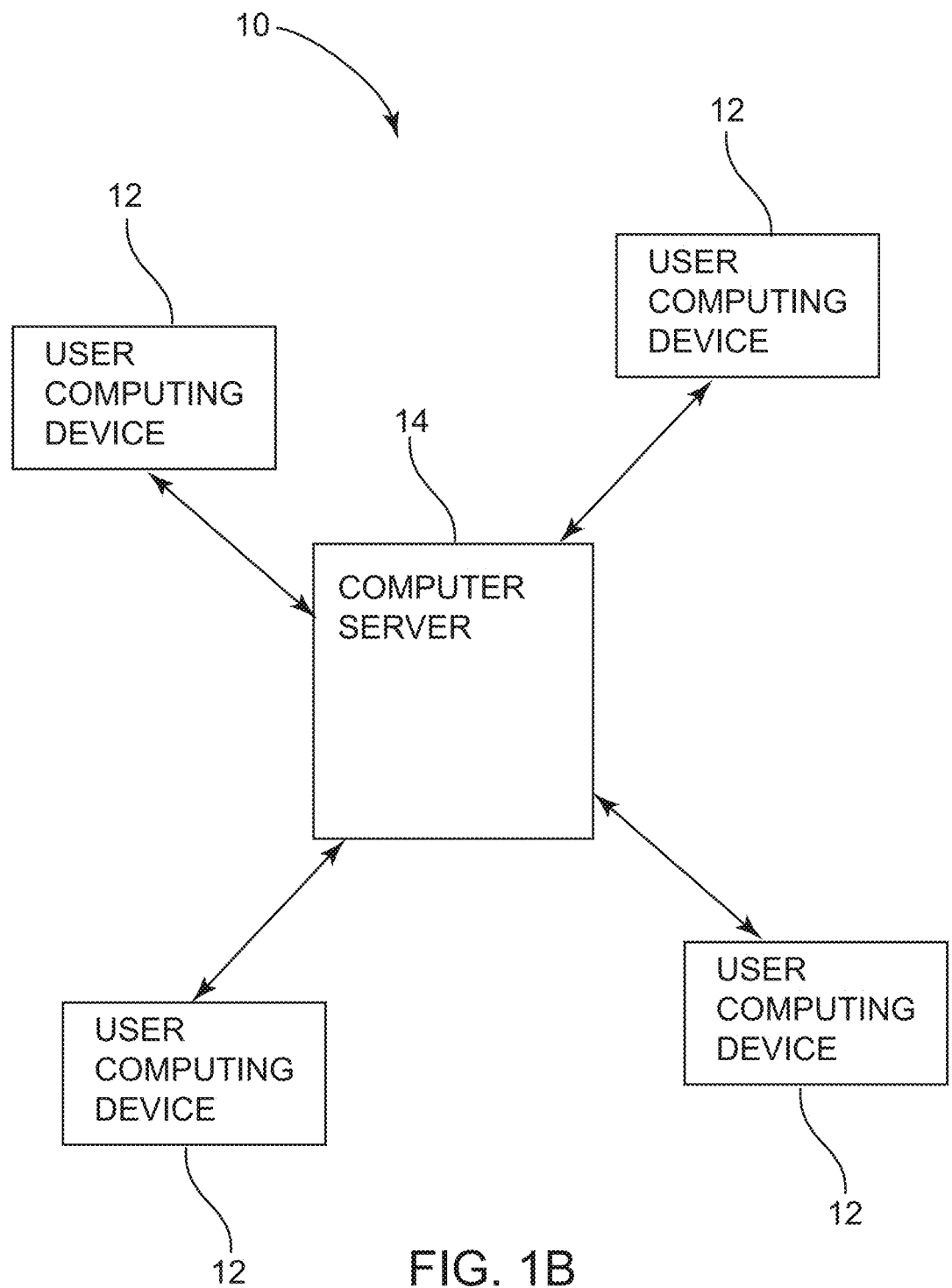
FIG. 1B is a diagrammatic view of a location-based interaction system according to an embodiment.

FIG. 1B depicts an embodiment of a location-based interaction system 10. The system 10 may include user computing devices 12 and a server 14, wherein each user computing device 12 is coupled to the computer server 14. The coupling between each user computing device 12 and the server 14 may be a network connection, such as a wireless connection through an Internet connection, a Wi-Fi connection, a Bluetooth connection, or the like, wherein the user computing device 12 may communicate with and receive communication from the server 14. The user computing device 12 may be a desktop computer, a laptop, a tablet, a smartphone, a wearable device, and the like. The server 14, in some embodiments, may be a computer server or a cloud-based infrastructure architecture.

The server 14 may include a memory storing user data. The memory of the server 14 may store user data, such as a username, a password, and profile information. The user data may also include other identifying information of the user, such as employer, profession, college attending or graduated from, hobbies, likes, interests and the like. The server 14 may also include user preferences stored in the server, wherein the user preferences are associated with the user data. The user preferences may include a selection of the one or more of the user data, such as selection of one or more of the other identifying information of the user, such as employer, profession, college attending or graduated from, hobbies, likes, interests, and the like. The user preferences may be utilized as criteria to find other users that have related or the same identifying information, such as employer, profession, college attending or graduated from, hobbies, likes, interests, and the like.

Figure 11:
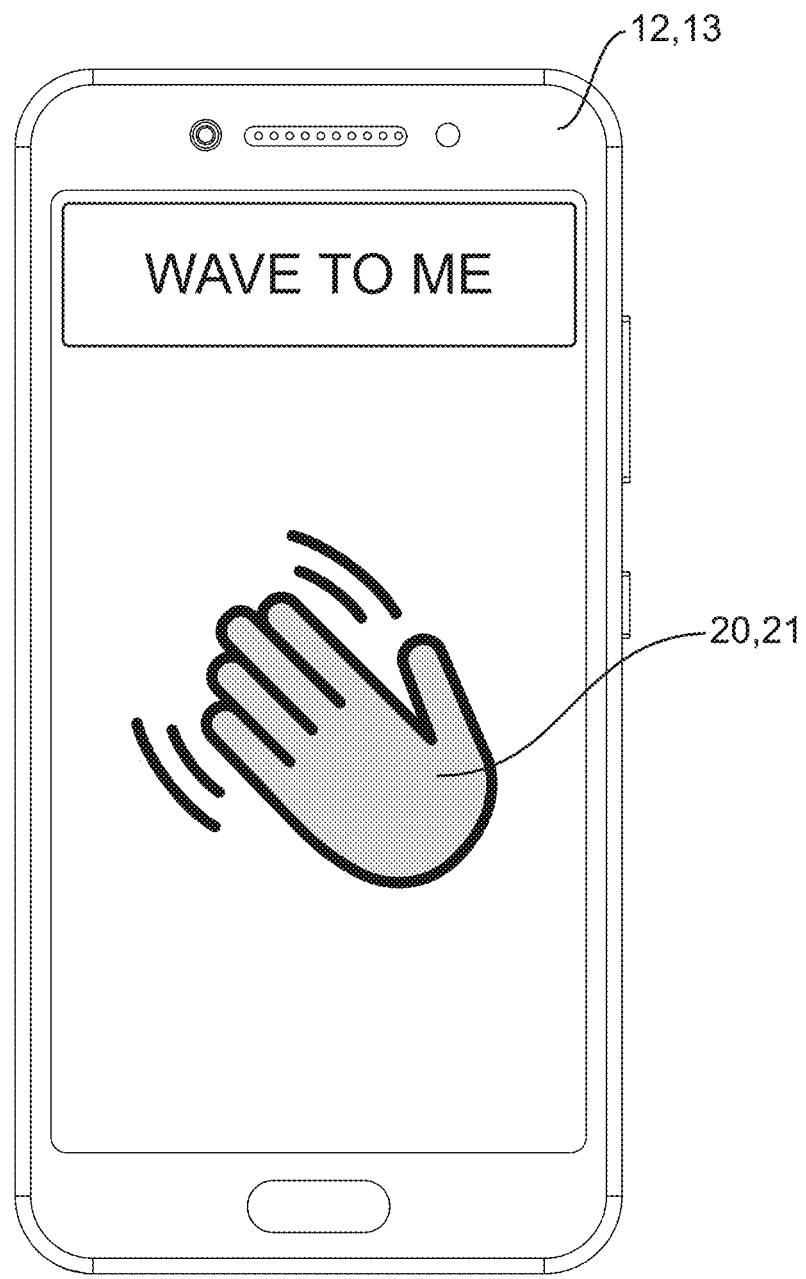
FIG. 11 is a front view of a user computing device operating as part of a location-based interaction system according to an embodiment.
Figure 16:
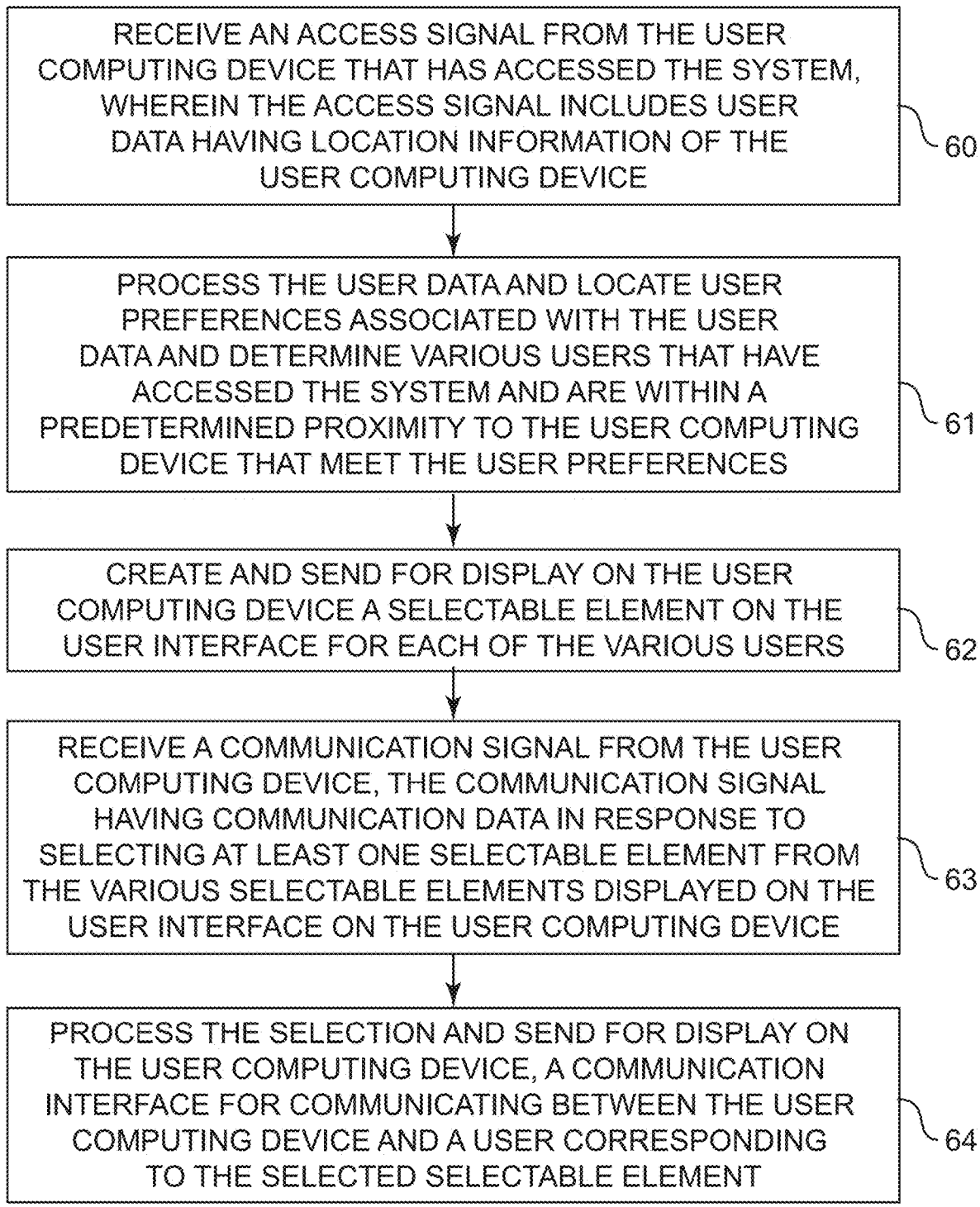
FIG. 16 is a flow chart of a second embodiment of programmed instructions for operation of a location-based interaction system according to an embodiment.

The user computing device 12 may be coupled to the server 14. Referring further to FIGS. 1B and 16, the server 14 may be programmed to receive a signal from the user computing device 12 that has accessed the system 10, wherein the signal includes user data having location information of the user computing device 12, such as by running a location-based interaction app on the user computing device 12 (Step 60). The server 14 may then be programmed to process the user data, in response to receiving the signal from the user computing device 12, and locate user preferences associated with the user data and determine various users that have accessed the system 10 and are within a predetermined proximity to the user computing device 12 that meet the user preferences (Step 61), and create and send for display on the user computing device 12 a selectable element on the user interface for each of the various users (Step 62). For example, the interface 20 may include a depiction of the location of the user computing device 12. Others accessing the system 10 and in proximity may be displayed on the user interface 20 as selectable users 26 by the user computing device 12 to engage in communication with other users. Accordingly, the server 14 may further be programmed to receive a signal from the user computing device 12 having communication data in response to selecting at least one user 26 from the various users 26 displayed on the user interface 20 on the user computing device 12 (Step 63), and process the selection and send for display on the user computing device 12, a communication interface for communicating between the user computing device 12 and the selected user 26 (Step 64). The users may communicate through text, multimedia messaging, to even voice communication through the communication interface, such as that depicted in FIG. 11.

Various uses of the system 10 are depicted in FIGS. 6-8. FIG. 6 depicts various vehicles that are engaged in the system 10, wherein several of the users are within a traffic jam. The users may discuss what is creating the traffic jam. FIG. 7 depicts individuals in a line at an amusement park engaging in conversation with the system 10. FIG. 8 depicts individuals on a train or bus passing time by engaging in conversation with individuals that meet the criteria established by the user preferences. The system 10 may include users in any of the situations described in FIGS. 6-8, or other similar situations, wherein people may be using the system 10 on a train and wish to sit together, or in line at an amusement park and want to talk, and so forth. As described above, the system 10 may operate to assist individual in meeting up with each other, particularly in first time meetings. These first time meetings may be between two or more individuals, such as, but not limited to, meetings such as convention meetings, business meetings, service provider meetings, meeting a travel host, meeting a tutor, meeting a tour guide, meeting a date, meeting a group excursion, meeting a study group, meeting a rideshare, meeting a delivery person, and the like.

Embodiments may be available on or through the internet, such as through domain names reserved and owned by Applicant that include friendly-wave.com, wavetome.com, freewaylink.com, isdatyou.com, and the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A location-based interaction system comprising:
    a server having a memory storing user data and user preferences for a plurality of users;
    a first user computing device coupled to the server; and
    a first external device coupled to the user computing device, wherein:
        the server is programmed to:
            receive an access signal from the first user computing device that has accessed the system, wherein the access signal includes first user data having first location information of the first user computing device;
            in response to receiving the access signal from the first user computing device, process the first user data and locate user preferences associated with the first user data and determine at least a second user computing device that has accessed the system and is within a predetermined proximity to the first user computing device and is associated with second user data that meets the user preferences associated with the first user data; and
            create and send for execution on the first user computing device instruction to send a first alert signal to the first external device; and
        the first user computing device is programmed to:
            automatically execute the instruction from the server to send the first alert signal to the first external device and send the first alert signal to the first external device for automatic execution, wherein the first external device broadcasts a first alert in response to receiving and processing the first alert signal.

2. The system of claim 1, wherein the server is further programmed to create and send for execution on the second user computing device instruction to send a second alert signal to the second external device at substantially the same time as sending instructions to the first user computing device to send the first alert signal to the first external device.

3. The system of claim 2, wherein the second user computing device is programmed to automatically execute the instruction from the server to send the second alert signal to the second external device and send the second alert signal to the second external device for automatic execution, wherein the second external device broadcasts a second alert in response to receiving and processing the second alert signal.

4. The system of claim 1, wherein the first external device broadcasting the first alert comprises broadcasting a visual alert.

5. The system of claim 1, wherein the first external device broadcasting the first alert comprises broadcasting an audio alert.

6. The system of claim 1, wherein the first external device broadcasting the first alert comprises broadcasting a haptic alert.

7. The system of claim 3, wherein the second external device broadcasting the second alert comprises broadcasting a visual alert.

8. The system of claim 3, wherein the second external device broadcasting the second alert comprises broadcasting an audio alert.

9. The system of claim 3, wherein the second external device broadcasting the second alert comprises broadcasting a haptic alert.

10. A location-based interaction system comprising:
a server having a memory storing user data and user preferences; and
a user computing device coupled to the server, wherein the server is programmed to:
receive an access signal from the user computing device that has accessed the system, wherein the access signal includes user data having location information of the user computing device;
in response to receiving the access signal from the user computing device, process the user data and locate user preferences associated with the user data and determine various users that have accessed the system and are within a predetermined proximity to the user computing device that meet the user preferences;
create and send for display on the user computing device a selectable element on the user interface for each of the various users;
receive a communication signal from the user computing device, the communication signal having communication data in response to selecting at least one selectable element from the various selectable elements displayed on the user interface on the user computing device;
process the selection and send for display on the user computing device, a communication interface for communicating between the user computing device and a user corresponding to the selected selectable element.

11. The system of claim 10, wherein the communication interface is configured to allow communication between the user computing device and the user corresponding to the selected selectable element through a communication means selected from the group consisting of text, multimedia messaging, and voice communication.

12. The system of claim 10, wherein the user data includes a username, a password, and profile information.

* * * * *